United States Patent
Kitamura (10) Patent No.: US 9,418,325 B1
(45) Date of Patent: Aug. 16, 2016

(54) DOCUMENT BOX SYNCHRONIZATION ON AN IMAGING SYSTEM

(71) Applicant: KYOCERA Document Solutions Inc., Osaka (JP)

(72) Inventor: Mitsuhiro Kitamura, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/670,049

(22) Filed: Mar. 26, 2015

(51) Int. Cl.
*G06K 15/00* (2006.01)
*G06F 3/12* (2006.01)
*G06K 15/02* (2006.01)

(52) U.S. Cl.
CPC ........ *G06K 15/4095* (2013.01); *G06K 15/1803* (2013.01)

(58) Field of Classification Search
USPC .............................. 358/1.13, 1.14, 1.15, 1.16
See application file for complete search history.

(56) References Cited

U.S. PATENT DOCUMENTS

| | | | |
|---|---|---|---|
| 2010/0214604 A1 | 8/2010 | Hosono et al. | |
| 2012/0306984 A1* | 12/2012 | Yahata | B41J 2/32 347/179 |
| 2013/0088738 A1* | 4/2013 | Tajima | G06F 3/1204 358/1.14 |
| 2013/0229690 A1* | 9/2013 | Sumita | H04N 1/00127 358/1.15 |
| 2013/0258408 A1* | 10/2013 | Mizutani | G03G 15/5091 358/1.16 |
| 2014/0093079 A1* | 4/2014 | Scott | H04L 63/08 380/270 |
| 2014/0118769 A1* | 5/2014 | Adachi | G06F 3/1211 358/1.13 |
| 2015/0116755 A1* | 4/2015 | Hayakawa | G06F 3/1288 358/1.14 |
| 2015/0295898 A1* | 10/2015 | Tredoux | H04L 63/0492 713/176 |

FOREIGN PATENT DOCUMENTS

| | | |
|---|---|---|
| JP | 2008-200898 A | 9/2008 |
| JP | 2010-199642 A | 9/2010 |
| JP | 2013-157848 A | 8/2013 |

* cited by examiner

*Primary Examiner* — Jerome Grant, II
(74) *Attorney, Agent, or Firm* — McDonnell Boehnen Hulbert & Berghoff LLP (57) ABSTRACT

In one aspect, an example method includes receiving, by an image forming device, authentication data corresponding to an external device; transmitting, by the image forming device, authentication approval data; after transmitting the authentication approval data, the image forming device receiving a first document list from the external device, wherein the first document list includes first document data; responsive to receiving the first document list, the image forming device retrieving second document data corresponding to documents stored by the image forming device, wherein the stored documents correspond to the external device; identifying a document using the first and second document data, wherein data corresponding to the identified document is included in either the first document data or the second document data; and responsive to the identification, transferring the data corresponding to the identified document between the external device and the image forming device.

20 Claims, 6 Drawing Sheets

DOCUMENT BOX SYNCHRONIZATION ON AN IMAGING SYSTEM

BACKGROUND

1. Field of the Invention

Unless otherwise indicated herein, the description in this background section is not prior art to the claims in this application and is not admitted to be prior art by inclusion in this section. The present disclosure relates to methods and systems for automatically synchronizing documents between an image forming device and an external device.

2. Description of the Related Art

Modern image forming devices are becoming increasingly complex as a result of added functions, applications, and services. For example, some image forming devices may include the ability to store documents in a local data storage or other storage medium. In addition, some image forming devices may include the ability to communicate with external devices, such as handheld electronic devices, smartphones, tablet computers, and the like. External devices may be able to transfer documents to and from the image forming device for storage, printing, or further actions based on the functions of the image forming device.

For a variety of reasons, a user of the image forming device may seek to transfer and/or receive documents and other data with minimal action from the user. For example, a user may wish to transfer and receive documents automatically between an image forming device and a handheld external device.

SUMMARY

In a first aspect, a method is provided. The method preferably includes receiving, by an image forming device, authentication data corresponding to an external device. The method further includes transmitting, by the image forming device, authentication approval data. The method then includes, after transmitting the authentication approval data, the image forming device receiving a first document list from the external device, wherein the first document list includes first document data. The method then includes, responsive to receiving the first document list, the image forming device retrieving second document data corresponding to documents stored by the image forming device, wherein the stored documents correspond to the external device. The method further includes identifying a document using the first and second document data, wherein data corresponding to the identified document is included in either the first document data or the second document data. The method then includes, responsive to the identification, transferring the data corresponding to the identified document between the external device and the image forming device.

In a second aspect, a non-transitory computer-readable medium is provided. The non-transitory computer-readable medium has stored thereon computer instructions that, upon execution by a processor, cause the performance of a set of acts including receiving, by an image forming device, authentication data corresponding to an external device. The set of acts further includes transmitting, by the image forming device, authentication approval data. The set of acts then includes, after transmitting the authentication approval data, the image forming device receiving a first document list from the external device, wherein the first document list includes first document data. The set of acts also includes, responsive to receiving the first document list, retrieving second document data corresponding to documents stored by the image forming device, wherein the stored documents correspond to the external device. The set of acts then includes identifying a document using the first and second document data, wherein data corresponding to the identified document is included in either the first document data or the second document data. The set of acts further includes, responsive to the identification, transferring the data corresponding to the identified document between the external device and the image forming device.

In a third aspect, method is provided. The method preferably includes transmitting, by an external device, to an image forming device, authentication data corresponding to the external device. The method also includes receiving, by the external device, authentication approval data. The method then includes, after receiving the authentication approval data, the external device receiving a first document list, wherein the first document list includes first document data corresponding to documents stored on the image forming device. The method then includes responsive to receiving the first document list, the external device retrieving a second document list stored on the external device. The method also includes the external device identifying a document using the first and second document lists, wherein data corresponding to the identified document is included in either the first document list or the second document list. The method then includes, responsive to the identification, transferring data corresponding to the identified document between the external device and the image forming device.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims, are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

As noted above, a user of an image forming device may seek to transfer documents and other data between the image forming device and an external device with minimal action from the user. Traditional methods of transferring documents and document data may include manually selecting documents to transmit and receive. However, this method may be inefficient and require a user to spend time searching for and selecting the correct document or documents.

As an alternative approach, the present disclosure may relate to automatic synchronization of documents between an image forming device and an external device. An example image forming device may include a plurality of functions, which may include the storage of documents on a local hard drive or other storage medium, called a "document box." The document box may store documents on the image forming device for use in connection with other functions of the device such as printing, faxing, emailing, and copying, for example. The example image forming device may also be able to communicate with an external device, such as a handheld electronic device, for example. The external device may include one or more documents a user wishes to print, email, or otherwise use in connection with the functions of the image forming device.

In order to effectively use one or more functions of the image forming device, a user may wish to synchronize document on the external device and the image forming device by transferring data corresponding to the documents between the two devices. In some examples, the synchronization may occur automatically without any user interaction. In other examples, the synchronization may occur automatically after certain initial settings are entered. For instance, a user may establish or register an account to use in connection with the image forming device and external device. In still other examples, as part of the synchronization, a user may be prompted to take an action based on one or more documents identified by the image forming device and/or external device.

In order to perform the synchronization, an example method may first include performing an authentication between the external device and the image forming device. The authentication procedure may first include creating a user account on the image forming device such that the account corresponds to the external device. The example may then include transferring authentication data between the external device and the image forming device. The external device and/or image forming device may then make use of the authentication data to establish that the devices are authenticated.

Once the authentication has occurred, the example method may then include transferring data corresponding to any documents stored on the external device and/or the image forming device (i.e., document lists) between the external device and the image forming device. The data transfer may be automatic and may occur without input from a user. The data may include details of the documents stored by the respective devices, or associated with an account.

Responsive to transferring the documents list, the example method may include either the external device or image forming device retrieving a second document list from storage. As one example, the image forming device may receive a first document list from the external device, and retrieve a second document list from a data storage of the image forming device. The example method may then include the image forming device identifying one or more documents using the two document lists. Finally, the example method may include transferring the one or more identified documents between the external device and the image forming device.

II. System Examples

Figure 1:
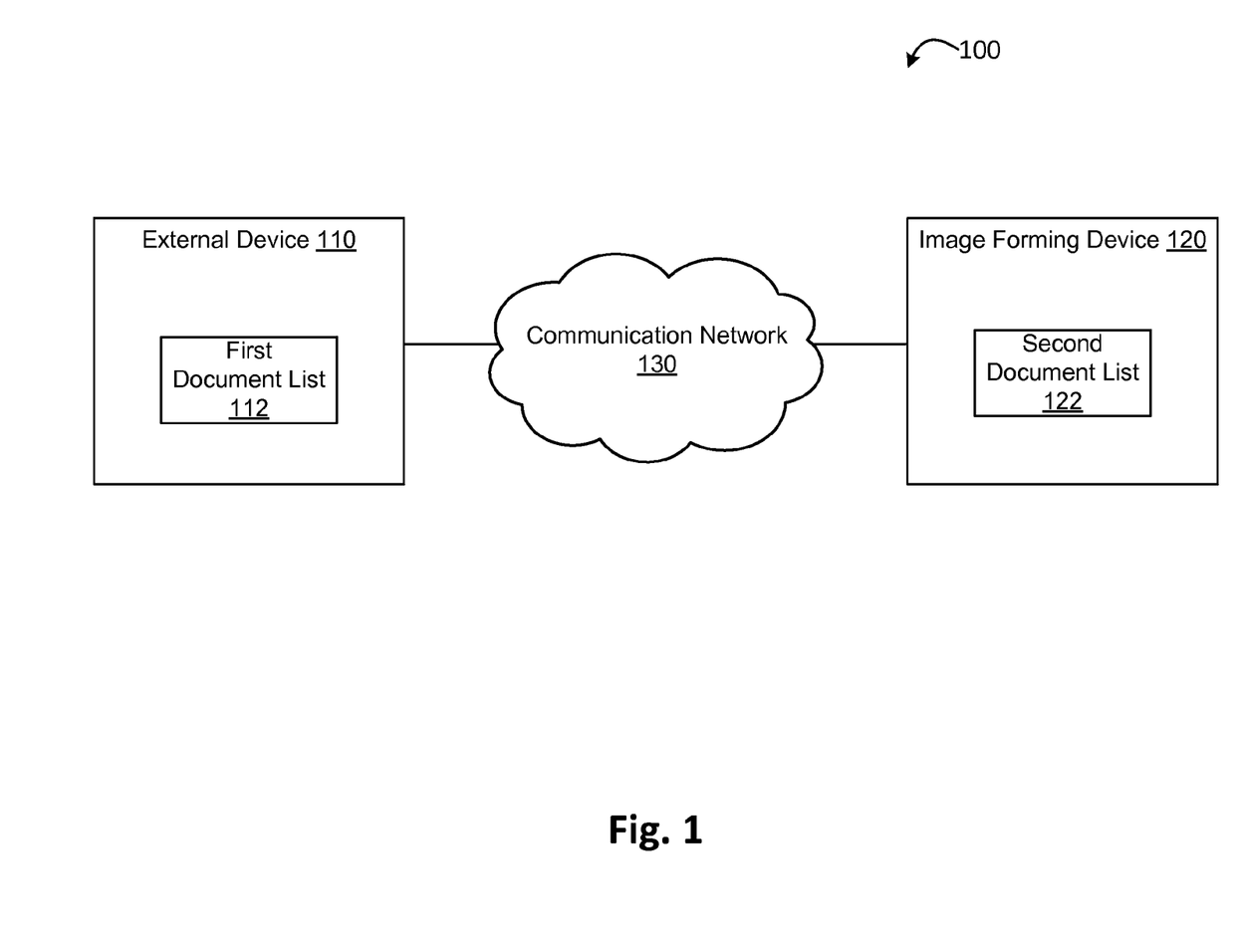
FIG. 1 is a block diagram illustrating an example system according to an embodiment of the present disclosure.

FIG. 1 is a block diagram illustrating an example system 100 according to an embodiment of the present disclosure. System 100 may include an external device 110 and an image forming device 120. External device 110 may include a first document list 112. Image forming device 120 may include a second document list 122. External device 110 and image forming device 120 may be connected via communication network 130.

a. External Device

External device 110 in system 100 may be implemented as a computing device, such as computing device 200 described in more detail below with respect to FIG. 2. In some examples, external device 110 may be implemented as a cellular mobile telephone (e.g., a smartphone), a computer (e.g., a notebook, tablet, or handheld computer), a personal digital assistant (PDA), or other similar device. It should be noted that external device 110 may be implemented as any device with the capabilities and functions described herein.

External device 110 may be configured to communicate with image forming device 120 using proximity communication via communication network 130. Proximity communication may include any form of short-range communication between two devices in which the two devices are located proximate each other, such as Bluetooth, ZigBee™, infrared wireless communication, and WiFi direct, for example. In some examples, external device 110 may be configured to communicate with image forming device 120 automatically upon coming within a given distance. For instance, where communication network 130 includes a Bluetooth connection, communication may begin automatically upon external device 110 coming within the effective range of a Bluetooth connection. The distance may vary depending on the strength and type of communication technology used.

In some examples, external device 110 may be configured to act as an operation panel for a connected image forming device, such as image forming device 120. The external device may include buttons, menus, settings, and capabilities that allow external device 110 to control image forming device 120 in a manner similar or identical to a traditional operation panel.

In other examples, external device 110 may be configured to create and/or store one or more accounts. Each account may correspond to a user of the external device and/or a user of the image forming device. Each account may include a user identification (User ID), a password, document data, and other data corresponding to the account holder.

External device 110 may include an application running on the device. The application may include a set of instructions stored in a data storage that, when executed by a processor, causes external device 110 to carry out one or more functions or actions, such as those described above, for example. In particular, external device 110 may include an application that allows the external device to function as an operation panel, as described above. The application may also allow the external device to securely communicate with and control an image forming device.

In some examples, external device 110 may also be configured to participate in an authentication with image forming device 120. In one example, the authentication procedure may include external device 110 transmitting authentication data to image forming device 120, such as a User ID, password, and/or other data, for example. The example may then include external device 110 receiving authentication approval data from image forming device 120. The authentication approval data may be any data or signal indicative of a proper authentication or approval of the connection between external device 110 and image forming device 120.

External device 110 may include first document list 112. In some examples, first document list 112 may include data such as document names, version numbers, time stamps (e.g., creation date, modification date, etc. . . . ), document sizes, meta-data, storage information, and any other data corresponding to one or more documents. First document list 112 may be stored in a data storage of external device 110. In addition, the data included in first document list 112 may refer to documents that are stored in a data storage of external device 110. Alternatively, the data may refer to documents stored on another device or system, which may be connected to external device 110 via a communication network or path.

It should be noted that a "document" as described in this disclosure may refer to each individual document file. As such, each version of a document may be treated as a separate document, and as a result, multiple versions of a document may be included as separate documents in first document list 112.

External device 110 may be configured to transmit first document list 112 to image forming device 120 via communication network 130. In some examples, external device may be configured to transmit first document list 112 responsive to receiving authentication approval data. For instance, external device 110 may transmit first document list 112 automatically upon receiving authentication approval data, without input from a user. In other examples, external device 110 may output a prompt to a user interface requesting a command to transmit first document list 112 to image forming device 120. In that instance, a user may allow or prevent first document list 112 from being transmitted to image forming device 120.

External device 110 may also be configured to transmit documents and/or document data to image forming device 120. In order to synchronize documents between the external device and the image forming device, external device 110 may transmit one or more documents and or corresponding data to image forming device 120. External device 110 may also be configured to receive similar types of data as part of the synchronization.

b. Image Forming Device

Image forming device 120 in system 100 may be implemented as a computing device, such as computing device 200 described in more detail below with respect to FIG. 2. In some examples, image forming device 120 may be implemented as a multifunction printing device, such as a Kyocera TASKalfa 5550ci, provided by Kyocera Document Solutions America of Fairfield, N.J., for example.

Image forming device 120 may include a plurality of functions, such as scanning, printing, emailing, faxing, and storage, among others. In particular, a storage function of image forming device 120 may be referred to as a "document box." The document box may include a data storage, which may be integrated with or separate from a data storage of image forming device 120. The document box function may include a file storage structure, and may allow image forming device 120 to store documents which may be used in connection with one or more other functions of the image forming device. In some examples, the document box may allow for separate storage of documents and/or document data based on one or more accounts. For instance, each account may be allotted an amount of storage space, such that documents may be stored on the image forming device and correspond to only a user of that account. In some examples, the image forming device may have no documents stored, or an account may have no corresponding documents stored on the image forming device.

Image forming device 120 may include second document list 122. Second document list 122 may have similar characteristics and/or functions to first document list 112, described above.

Image forming device 120 may be configured to communicate with external device 110 using proximity and/or short-range communication via communication network 130. As such, image forming device 120 may include a Bluetooth interface, ZigBee™ interface, infrared interface, and/or WiFi direct interface, for example. Image forming device 120 may be configured to communicate automatically with external device 110 upon coming within a given distance. As noted above, whether or not communication occurs and at what distance it begins may depend upon the type of communication and signal strength between image forming device 120 and external device 110.

In some examples, image forming device 120 may be configured to facilitate creation and/or storage of one or more accounts. Each account may correspond to a user of the image forming device and/or a user of an external device. An example account may include a user identification (User ID), password, documents, document data, and other data corresponding to an account holder. In one example, image forming device 120 may store a list of accounts (and corresponding information) in a data storage of the device.

Image forming device 120 may be configured to perform one or more actions with respect to authentication. For example, image forming device 120 may receive authentication data, such as a user ID, from external device 110. Image forming device 120 may then compare the received user ID to one or more user IDs stored by the image forming device, and determine that there is a match. After determining that there is a match, image forming device 120 may transmit authentication approval data to the external device. Authentication approval data may take the form of a notification, command, signal, or any other data indicative of an approved connection. In some examples, the authentication procedure described above may occur responsive to image forming device 120 coming within a range of external device 110.

In some examples, after the authentication occurs, image forming device 120 may receive first document list 112. Image forming device 120 may then use first document list 112 to identify one or more documents, which may be stored in a data storage (i.e., "document box").

In one example, image forming device 120 may identify one or more documents by comparing received first document list 112 to second document list 122, which may be stored by image forming device 120. The comparison may include comparing the document names, version numbers, time stamps, sizes, meta-data, and/or other document data included in each list. In some examples, a document list may not include any documents. For instance, when an external device connects with an image forming device for the first time, or where documents have been deleted from the image forming device, there may be no stored documents on the image forming device that correspond to the external device. In another example, the comparison may include the image forming device 120 comparing received first document list 112 to one or more documents (as opposed to second document list 122) stored in a data storage of image forming device 120.

Image forming device 120 may identify one or more documents or document data included in either first document list 112 or second document list 122. In some examples, documents or document data identified as being included in only one document list may be transmitted from the image forming device to the external device (or vice versa) in order to synchronize the two devices. In other examples, image forming device 120 may transmit data corresponding to the identified documents to the external device, while transmitting the identified documents themselves to a third device, such as a personal computer, which may be associated with the external device.

III. Example Computing Device

Figure 2:
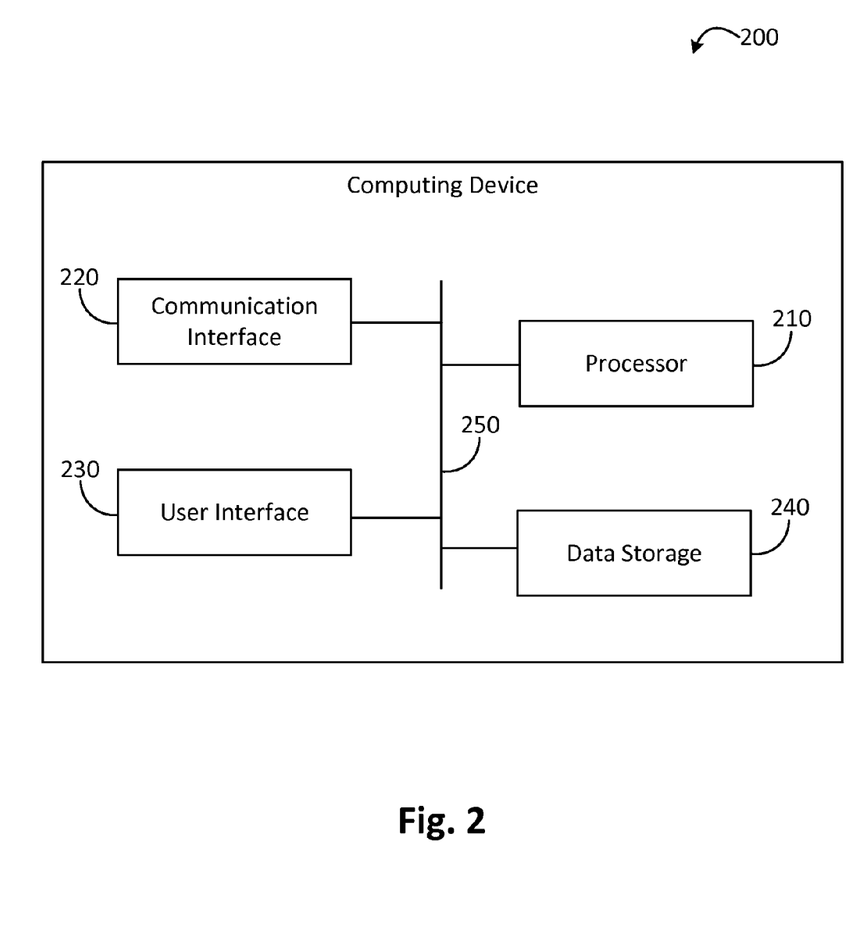
FIG. 2 is a block diagram illustrating an example computing device according to an embodiment of the present disclosure.

FIG. 2 is a block diagram illustrating an example computing device 200 according to an embodiment of the present disclosure. Computing device 200 may be configured for performing a variety of functions or acts, such as those described in this disclosure (including the accompanying drawings). In some examples, computing device 200 may be configured to perform one or more herein-described functions or acts of external device 110 or image forming device 120. Computing device 200 may include various components, including for example, one or more processors 210, communication interfaces 220, user interfaces 230, and data storages 240. The components of the computing device 200 may be communicatively connected to each other (or other devices or systems) via a system bus, network, or other link 250.

Processor 210 in computing device 200 may include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processor 210 may be configured to execute computer-readable program instructions contained in data storage 240, and/or other instructions as described herein.

Communication interface 220 in computing device 200 may be configured to allow computing device 200 to communicate with one or more devices (or systems) according to one or more protocols. In one example, communication interface 220 may be a wired interface, such as an Ethernet interface or a USB interface. As another example, communication interface 220 may be a wireless interface, such as a cellular or WiFi interface, for example. Other example communication interfaces may include an Ethernet connection, Universal Serial Bus (USB) connection, fiber-optic link, coaxial cable, Bluetooth, ZigBee, WiMAX, wireless wide-area network (WWAN), infrared communication, and/or other similar types of interfaces.

User interface 230 in computing device 200 may facilitate interaction with a user of the computing device, if applicable. As such, user interface 230 may include input components such as a keyboard, keypad, computer mouse, trackball, joystick, camera, microphone, voice recognition module, and touch sensitive panel, and output components such as a display screen (which, for example, may be combined with a touch sensitive panel), sound speaker, and haptic feedback system.

Data storage 240 in computing device 200 may include one or more volatile, non-volatile, removable, and/or non-removable storage components, such as magnetic, optical, or flash storage, and may be integrated in whole or in part with processor 210. Further, data storage 240 may take the form of a non-transitory computer-readable storage medium, having stored thereon program instructions (e.g., compiled or non-compiled program logic and/or machine code) that, when executed by processor 210, cause computing device 200 to perform one or more functions or acts, such as those described in this disclosure. Such program instructions may define or be part of a discrete software application that can be executed in response to certain inputs received from user interface 230, for instance. Data storage 240 may also store other types of information or data, such as those types described throughout this disclosure (e.g., authentication data, document data, and document lists).

IV. Example Scenarios

Figure 3:
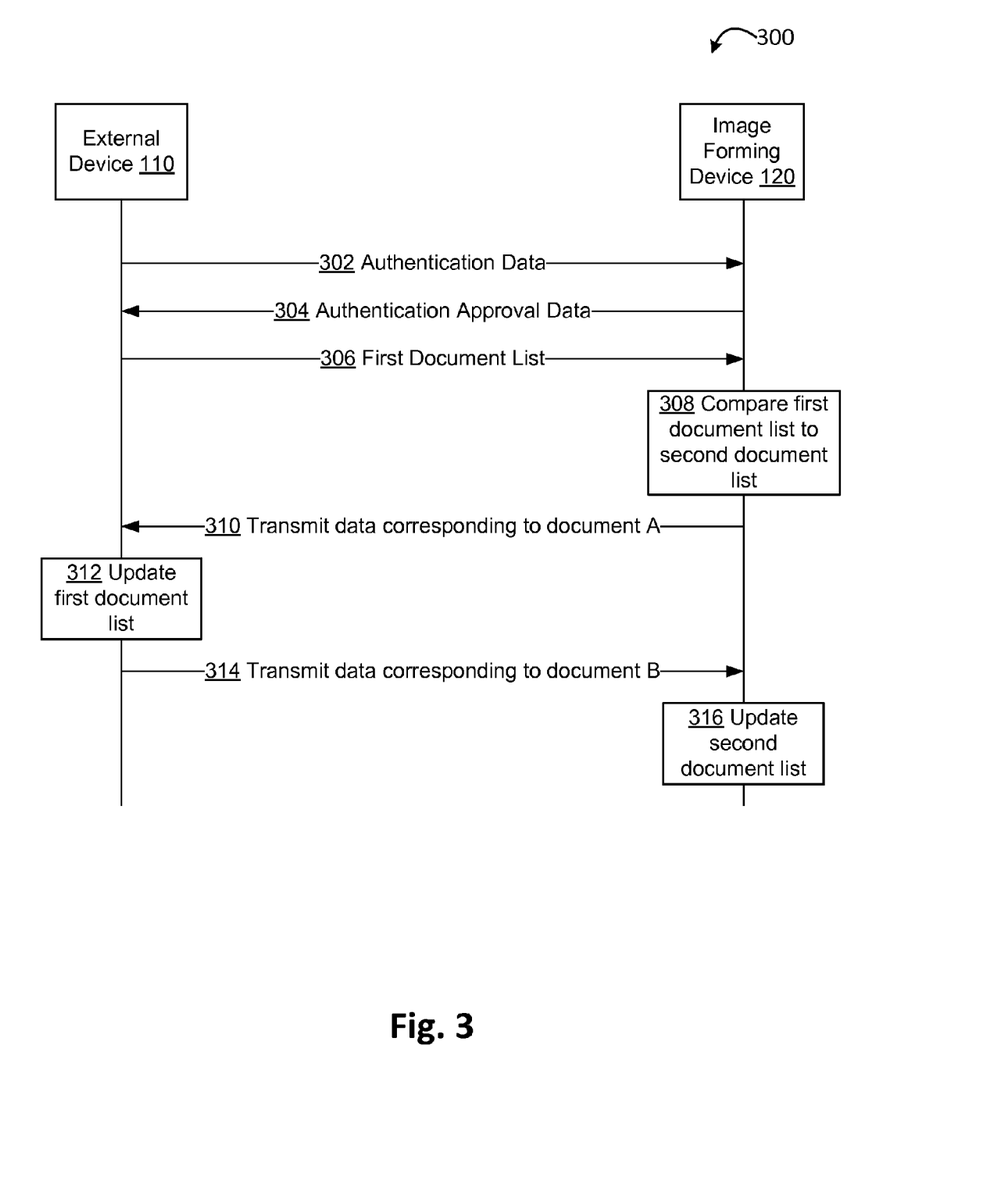
FIG. 3 is a diagram illustrating an example scenario according to an embodiment of the present disclosure.
Figure 4:
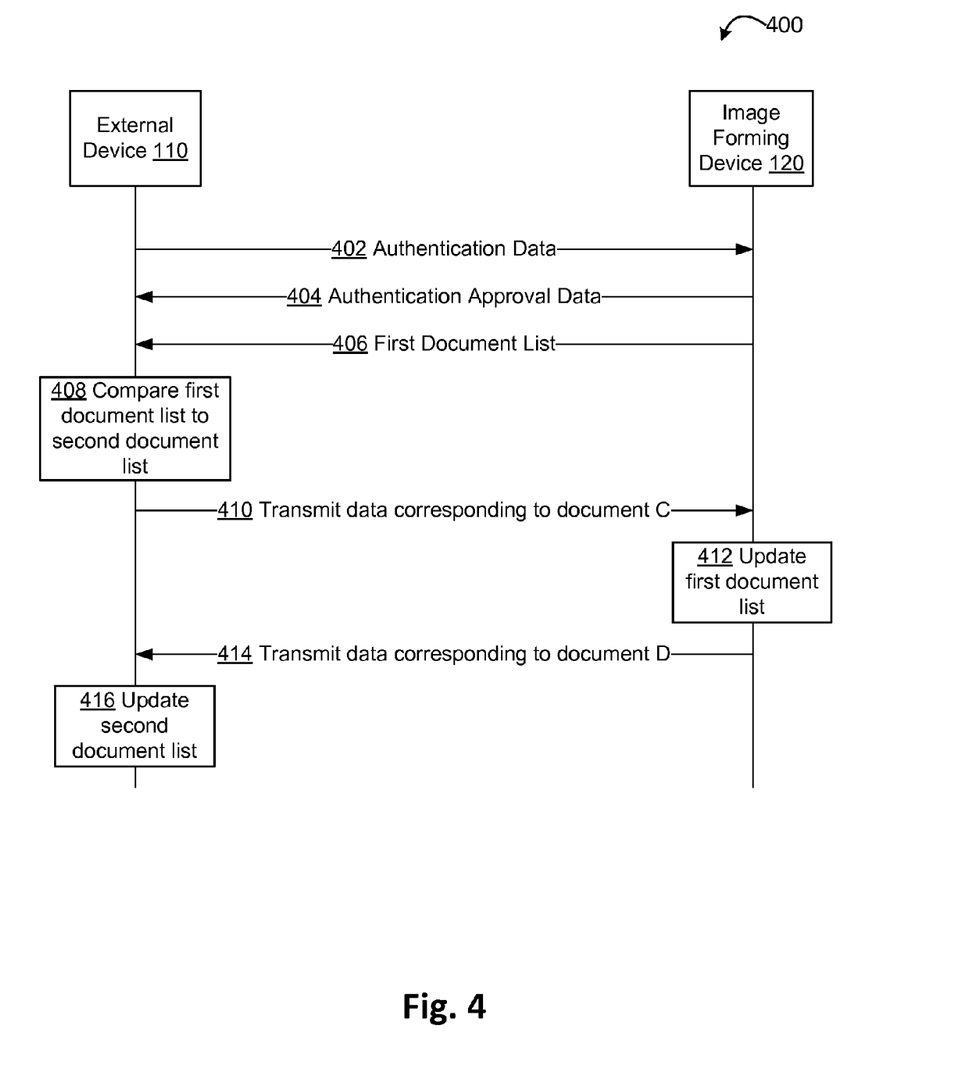
FIG. 4 is a diagram illustrating another example scenario according to an embodiment of the present disclosure.

FIGS. 3 and 4 are diagrams illustrating example scenarios according to various embodiments of the present disclosure. Although FIGS. 3 and 4 illustrate specific scenarios, it should be noted that one or more steps may be performed in a different order than the order shown, or may not be performed at all, while remaining within the scope of this disclosure. Some or all of the steps shown in FIGS. 3 and 4 may be performed by system 100 and/or the various components of system 100, including external device 110, image forming device 120, and communication network 130.

Scenario 300 may include an external device 110 and an image forming device 120, which may be in communication with each other via a communication path or network. Scenario 300 may begin at step 302, in which external device 110 transmits authentication data to image forming device 120. As noted above, the authentication data may include a user ID. Image forming device 120 may then compare the received authentication data against stored data (which may include a list of stored user IDs). Where there is a match, or where image forming device 120 otherwise determines that external device 110 is approved, step 304 may include image forming device 120 transmitting authentication approval data to external device 110.

At step 306 of scenario 300, external device 110 may transmit a first document list to image forming device 120. In some examples, the first document list may be transmitted responsive to receiving the authentication approval data, and/or may be transmitted automatically upon receiving authentication approval data (i.e., without user input).

At step 308, upon receiving the first document list, image forming device 120 may compare the first document list to a second document list, which may be stored on the image forming device. In one example, performing the comparison may include comparing the two lists. In another example, performing the comparison may include comparing the first document list to a subset of documents stored on image forming device 120, wherein the subset of documents correspond to external device 110. The subset may be determined based on the received authentication data, such that the subset includes all documents associated with a given user ID or account, for example. Further, in any of the above examples, the comparison may alternatively, or in addition, include comparing data corresponding to the documents and document lists, as opposed to the documents themselves (e.g., document names, sizes, time stamps, meta-data, and other information). In some examples, there may be no documents stored on the image forming device, or there may be no documents corresponding to a given account or external device that are stored on the image forming device.

Image forming device 120 may then use the comparison to identify one or more documents. In one example, the identified one or more documents may be included in either the first document list or the second document list. In another example, the identified one or more documents may include documents or data that are included in either the first document list or are stored on the image forming device. In scenario 300, document A has been identified as being included in the second document list only, while document B has been identified as being included in the first document list only.

At step 310, scenario 300 may include image forming device 120 transmitting data corresponding to the identified one or more documents (i.e., document A). In one example, the transmitted data may include the document itself. In another example, the transmitted data may include the document name, size, time stamps, meta-data, and/or other corresponding information.

In some examples, at step 310, scenario 300 may also include transmitting a command, signal, or indicator to external device 110 requesting that a document identified in step 310 (i.e., document B) be transmitted to image forming device 120.

At step 312, scenario 300 may include the external device updating the first document list to include the data corresponding to the identified one or more documents. Step 312 may include external device 110 adding a new document to the first document list (i.e., adding document A), and/or may include adding the document A's name, file size, time stamps, meta-data, and/or other information.

At step 314, scenario 300 may include external device 110 transmitting data corresponding to an identified document (i.e., document B) to image forming device 120. The data may be transmitted in response to receiving a command, signal, or indicator. As was previously determined in step 308, document B is included in the first document list but not the second document list. In some examples, the transmitted data may include document B itself and/or document B's name, size, time stamps, meta-data, and/o other corresponding information.

At step 316, scenario 300 may then include image forming device 120 updating the second document list. Step 316 may involve image forming device 120 adding the received document (i.e., document B) to the second document list, and/or may involve adding the document name, file size, time stamp, meta-data, and/or other information to the second document list.

FIG. 4 is a diagram illustrating an example scenario 400 according to an embodiment of the present disclosure. Scenario 400 may be similar or identical in some respects to scenario 300. For example, steps 402 and 404 may correspond to steps 302 and 304 of scenario 300. However, scenario 400 may differ from scenario 300 in that the roles of external device 110 and image forming device 120 may be switched in some respects.

At step 406, scenario 400 may involve image forming device 120 transmitting a first document list to external device 110. At step 408, external device 110 may compare the first document list to a second document list, which may be stored on the external device. The comparison may be carried out in a manner similar or identical to the manner described above in connection with step 308, but with the role of the devices switched.

In scenario 400, external device 110 has compared the first and second document lists, and has determined that document C is included in only the second document list, while document D is included in only the first document list. As such, at step 410, external device 110 may transmit data corresponding to document C to image forming device 120. External device 110 may also transmit a command, signal, or indicator requesting that document D be transmitted by image forming device 120.

At step 412, image forming device 120 may then update the first document list, to include document C and/or information corresponding to document C, such as document C's name, size, time stamps, meta-data, and/or other information.

Then, at step 414, image forming device 120 may transmit data corresponding to document D to external device 110. This step may be done in response to receiving the command, signal, or indicator from external device 110. Finally, at step 416, external device 110 may update the second document list, in a manner similar or identical to those described above.

In some examples, the timing of these steps may occur out of order from what is shown in FIGS. 3 and 4. For example, as shown, the first document list and second document list are updated after the respective documents are received. However, in one variation, the first and second document lists may be updated prior to receiving the respective documents. Other variations are possible as well.

V. Example Methods

Figure 5:
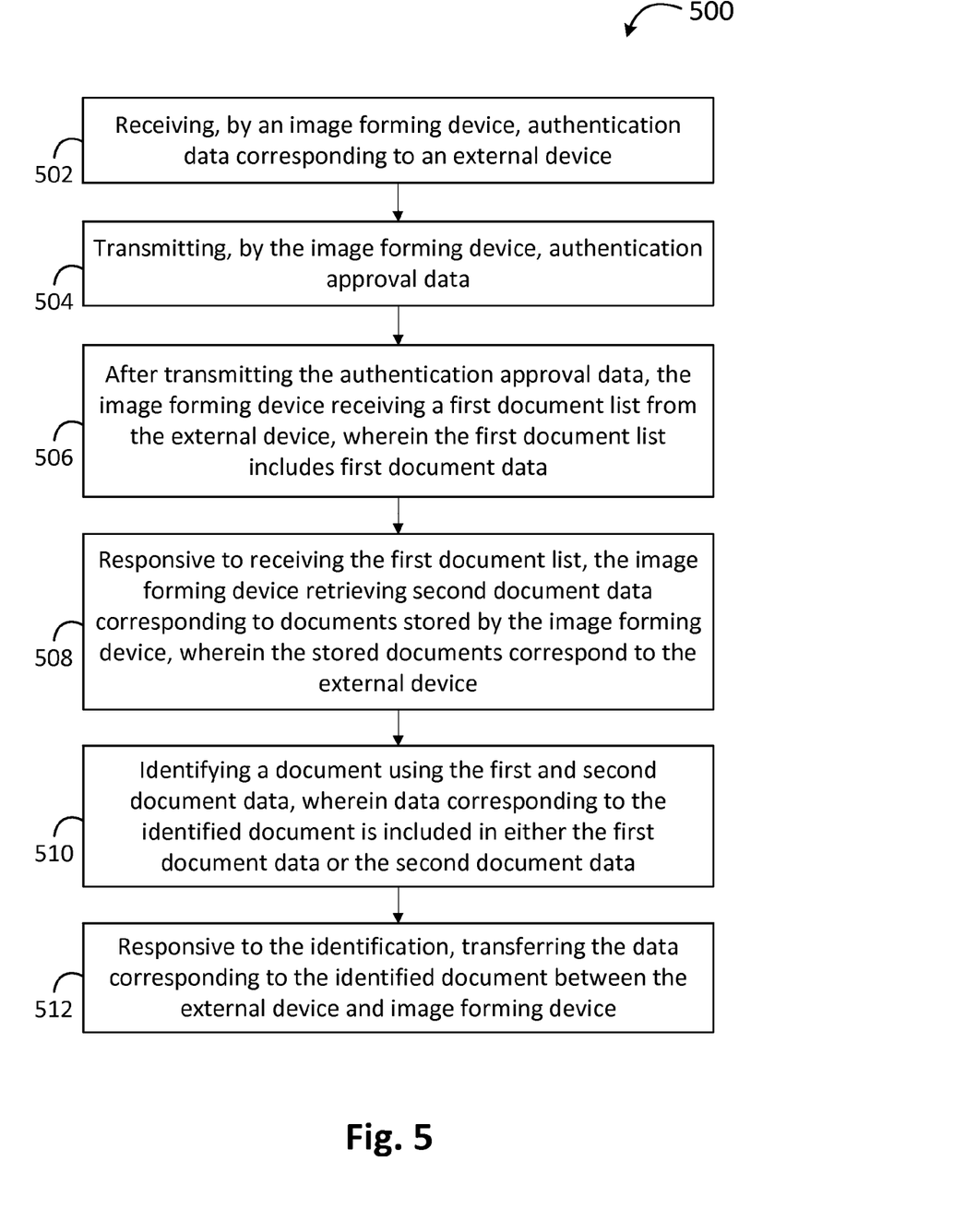
FIG. 5 is a flow chart illustrating an example method according to an embodiment of the present disclosure.
Figure 6:
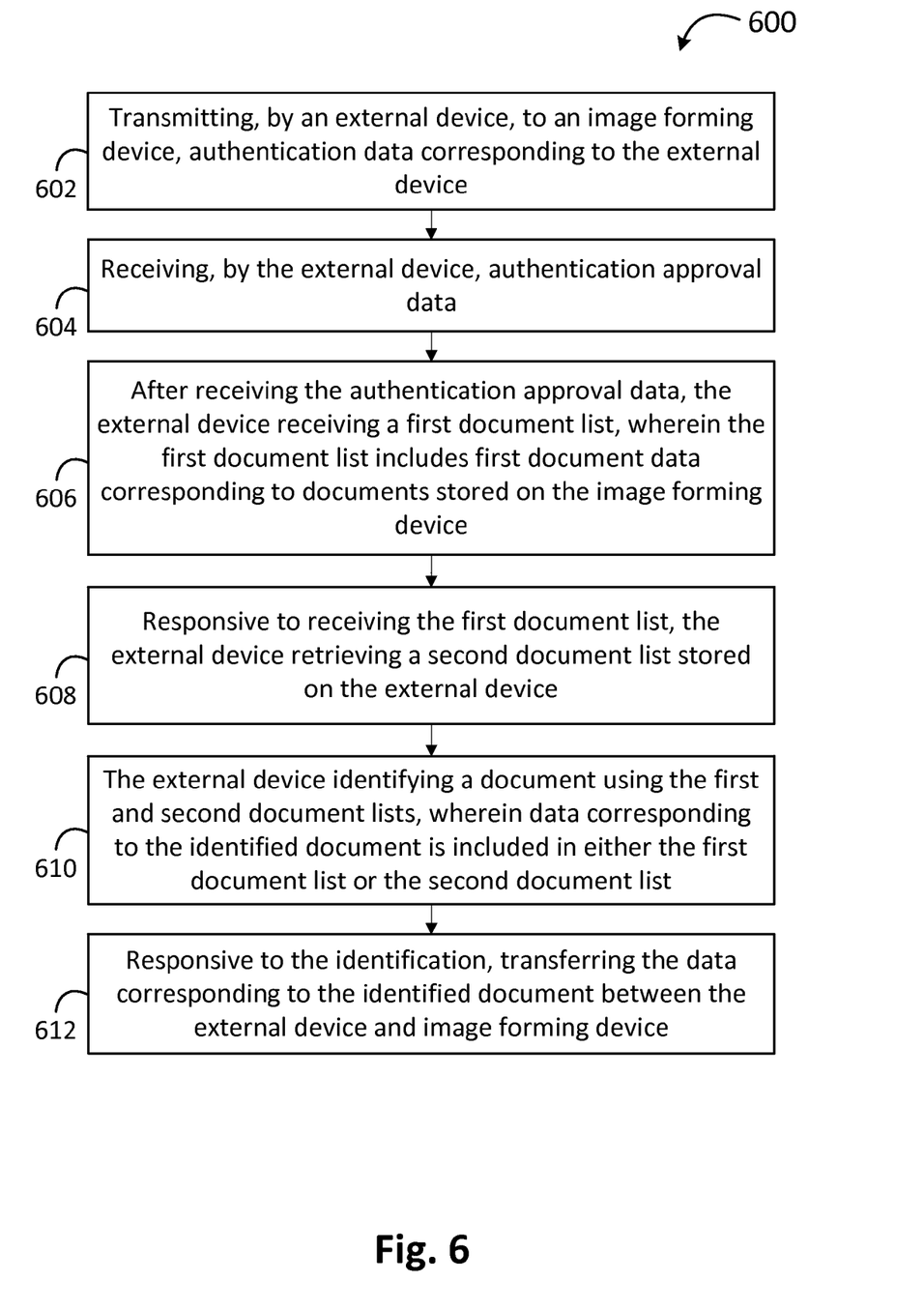
FIG. 6 is a flow chart illustrating another example method according to an embodiment of the present disclosure.

FIGS. 5 and 6 are flow charts illustrating example methods according to various embodiments of the present disclosure. Although FIGS. 5 and 6 illustrate methods 500 and 600 as including certain blocks in a particular order, it should be understood that blocks may be added, subtracted, and/or carried out in a different order while remaining within the scope of this disclosure. Furthermore, some or all of the blocks of methods 500 and 600 may be carried out by system 100 and/or the various components of system 100, including the external device 110, image forming device 120, and communication network 130, for example.

Method 500 may include blocks 502-512. At block 502, method 500 may include receiving, by an image forming device, authentication data corresponding to an external device. In one example, the authentication data may correspond to the external device itself, such as a user ID, for example. In another example, the authentication data may correspond to an account registered to the external device. In still another example, the authentication data may correspond to an application or a program running on the external device. As such, the authentication data may take a number of forms, including but not limited to identification numbers and codes, user IDs, account numbers, passwords, and other related information.

At block 504, method 500 may include the image forming device transmitting authentication approval data. The image forming device may transmit the authentication approval data in response to determining that the received authentication data matches account information stored on the image forming device. For example, the image forming device may store account information for a plurality of accounts, external devices, and/or users of the image forming device. The image forming device may then compare received authentication data to the stored account information. The image forming device may then determine that there is a match, and responsively generate and/or transmit authentication approval data. In some examples, image forming device may retrieve authentication approval data from a data storage, and/or may transmit a signal, command, or other information indicative of an approved authentication.

Transmitting the authentication approval data may further include displaying a notification on a display screen. For instance, when the image forming device transmits authentication approval data, the image forming device may also display a notification on a display of a user interface of the image forming device, which may indicate that a connection has been established. In another instance, an external device may display a notification on a display of a user interface of the external device. In other examples, the notification may take the form of an auditory signal, visual signal, or other form of notification.

At block 506, method 500 may include, after transmitting the authentication approval data, the image forming device receiving a first document list from the external device, wherein the first document list includes first document data.

In some examples, the first document data may include data corresponding to document names, time stamps, sizes, metadata, storage information, and/or any other data corresponding to one or more documents.

At block 508, method 500 may include, responsive to receiving the first document list, the image forming device retrieving second document data corresponding to documents stored by the image forming device, wherein the stored documents correspond to the external device. The image forming device may retrieve the second document data from a data storage. The second document data may be in the form of a second document list. In some examples, a second document list may be dynamically generated by the image forming device upon receiving the first document list. In other examples, a second document list may be pre-generated and stored by the image forming device. In still other examples, there may be no documents stored on the image forming device, or no documents corresponding to the external device.

In some examples, the stored one or more documents may correspond to one or more accounts. Each account may be registered to an external device, or may correspond to an application running on an external device.

At block 510, method 500 may include identifying a document using the first and second document data, wherein data corresponding to the identified document is included in either the first document data or the second document data. In some examples, the document may be identified by comparing the first document list to a second document list, to one or more stored documents, or to a subset of documents associated with an account.

At block 512, method 500 may include, responsive to the identification, transferring the data corresponding to the identified document between the external device and the image forming device. In some examples the data may be transmitted from the image forming device to the external device. In other examples, the data may be transmitted instead to a device or system associated with the external device, such as a personal computer or server, for example. In still other examples, data may be transmitted from the external device to the image forming device, particularly in the instance where there are no documents stored on the image forming device that correspond to the external device. Other variations are possible as well.

FIG. 6 is a flow chart illustrating an example method 600 according to an embodiment of the present disclosure. One or more blocks of method 600 may be similar to one or more blocks of method 500, however method 600 is directed toward examples generally from the perspective of an external device, whereas method 500 is directed to examples generally from the perspective of an image forming device.

At block 602, method 600 may include transmitting, by an external device, to an image forming device, authentication data corresponding to the external device. At block 604, method 600 may then involve receiving, by the external device, authentication approval data.

At block 606, method 600 may include, after receiving the authentication approval data, the external device receiving a first document list, wherein the first document list includes first document data corresponding to documents stored on the image forming device. In one example, the first document list may include documents corresponding to an account associated with the external device.

At block 608, method 600 may include, responsive to receiving the first document list, the external device retrieving a second document list stored on the external device.

At block 610, method 600 may include the external device identifying a document using the first and second document lists, wherein data corresponding to the identified document is included in either the first document list or the second document list. In one example, the external device may identify a document by comparing the first and second document lists, and/or the data included therein.

At block 612, method 600 may involve, responsive to the identification, transferring the data corresponding to the identified document between the external device and the image forming device. In a particular example, the external device has identified a document at step 610 that is included in the second document list but not the first document list. In that case, the external device may transmit data corresponding to the identified document to the image forming device.

VI. Other Examples

In some examples, external device 110 or image forming device 120 may act as a master device. In such an example, documents and/or document data may be transmitted only from one device to the other.

In other examples, the synchronization may include deleting or removing a document or document data from a device and/or document list. However, a notification or authorization may be required before a document may be deleted or removed.

In still other examples, documents included on the image forming device (i.e., included in the document box) may be deleted or removed from the image forming device upon disconnecting from the external device. For instance, when a user of an external device moves away from the image forming device further than a given distance, the image forming device may end the connection and remove the stored documents corresponding to the external device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   receiving, by an image forming device, authentication data corresponding to an external device;
   transmitting, by the image forming device, authentication approval data;
   after transmitting the authentication approval data, the image forming device receiving a first document list from the external device, wherein the first document list includes first document data;
   responsive to receiving the first document list, the image forming device retrieving second document data corresponding to documents stored by the image forming device, wherein the stored documents correspond to the external device;
   identifying a document using the first and second document data, wherein data corresponding to the identified document is included in either the first document data or the second document data; and
   responsive to the identification, transferring the data corresponding to the identified document between the external device and the image forming device.

2. The method of claim 1, further comprising:
   the image forming device receiving, from the external device, a request to register an account corresponding to the external device; and
   storing, on the image forming device, account information corresponding to the account.

3. The method of claim 2, wherein the authentication data further comprises a user ID corresponding to the account.

4. The method of claim 2, further comprising:
determining whether the received authentication data matches account information stored on the image forming device; and
upon determining that there is a match, generating authentication approval data.

5. The method of claim 1, wherein transmitting, by the image forming device, authentication approval data further comprises:
displaying a notification on a display screen.

6. The method of claim 1, wherein the image forming device retrieving second document data corresponding to documents stored by the image forming device further comprises:
retrieving a second document list corresponding to the stored documents, wherein the second document list includes the second document data.

7. The method of claim 1, wherein the image forming device retrieving second document data corresponding to documents stored by the image forming device further comprises:
retrieving documents stored by the image forming device, wherein the retrieved documents include the second document data.

8. The method of claim 1, further comprising:
identifying a second document, using the first and second document data;
responsive to the identification, transmitting a command to the external device; and
transferring data corresponding to the identified second document between the external device and the image forming device.

9. The method of claim 8, further comprising:
responsive to the transfer of data corresponding to the identified second document, modifying the second document data to include the data corresponding to the identified second document.

10. A non-transitory computer-readable medium, having stored thereon program instructions that, upon execution by a processor, cause performance of a set of acts comprising:
receiving, by an image forming device, authentication data corresponding to an external device;
transmitting, by the image forming device, authentication approval data;
after transmitting the authentication approval data, the image forming device receiving a first document list from the external device, wherein the first document list includes first document data;
responsive to receiving the first document list, retrieving second document data corresponding to documents stored by the image forming device, wherein the stored documents correspond to the external device;
identifying a document using the first and second document data, wherein data corresponding to the identified document is included in either the first document data or the second document data; and
responsive to the identification, transferring the data corresponding to the identified document between the external device and the image forming device.

11. The computer-readable medium of claim 10, the set of acts further comprising:
the image forming device receiving, from the external device, a request to register an account corresponding to the external device; and
storing, on the image forming device, account information corresponding to the account.

12. The computer-readable medium of claim 11, wherein the authentication data further comprises a user ID corresponding to the account.

13. The computer-readable medium of claim 11, the set of acts further comprising:
determining whether the received authentication data matches account information stored on the image forming device; and
upon determining that there is a match, generating authentication approval data.

14. The computer-readable medium of claim 10, wherein transmitting, by the image forming device, authentication approval data further comprises:
displaying a notification on a display screen.

15. The computer-readable medium of claim 10, wherein the image forming device retrieving second document data corresponding to documents stored by the image forming device further comprises:
retrieving a second document list corresponding to the stored documents, wherein the second document list includes the second document data.

16. The computer-readable medium of claim 10, wherein the image forming device retrieving second document data corresponding to documents stored by the image forming device further comprises:
retrieving documents stored by the image forming device, wherein the retrieved documents include the second document data.

17. The computer-readable medium of claim 10, the set of acts further comprising:
identifying a second document, using the first and second document data;
responsive to the identification, transmitting a command to the external device; and
transferring data corresponding to the identified second document between the external device and the image forming device.

18. The computer-readable medium of claim 17, the set of acts further comprising:
responsive to transferring the data corresponding to the identified second document, modifying the second document data to include the data corresponding to the identified second document.

19. A method comprising;
transmitting by an external device, to an image forming device, authentication data corresponding to the external device;
receiving, by the external device, authentication approval data;
after receiving the authentication approval data, the external device receiving a first document list, wherein the first document list includes first document data corresponding to documents stored on the image forming device;
responsive to receiving the first document list, the external device retrieving a second document list stored on the external device;
the external device identifying a document using the first and second document lists, wherein data corresponding to the identified document is included in either the first document list or the second document list; and
responsive to the identification, transferring the data corresponding to the identified document between the external device and the image forming device.

20. The method of claim 19, further comprising:
identifying a second document, using the first and second document data; and
responsive to the identification, transmitting a command to the image forming device; and
transferring data corresponding to the identified second document between the external device and the image forming device.

\* \* \* \* \*